US00RE36022E

United States Patent [19]

Blain

[11] E Patent Number: Re. 36,022

[45] Reissued Date of Patent: Jan. 5, 1999

[54] SERVO CONTROL FOR HYDRAULIC ELEVATOR

[76] Inventor: Roy W. Blain, Bollinger Hofe, 74078 Heilbronn, Germany

[21] Appl. No.: 812,870

[22] Filed: Mar. 6, 1997

Related U.S. Patent Documents

Reissue of:

[64] Patent No.: 5,593,004
Issued: Jan. 14, 1997
Appl. No.: 412,247
Filed: Mar. 28, 1995

[51] Int. Cl.[6] ..... B66B 9/04

[52] U.S. Cl. ..... 187/275; 91/447; 137/115.07

[58] Field of Search ..... 187/275, 272; 91/447; 137/115.07

[56] References Cited

U.S. PATENT DOCUMENTS

| | | | |
|---|---|---|---|
| 4,757,879 | 7/1988 | Rita | 187/275 |
| 5,014,823 | 5/1991 | Pelto-Huikko | 187/275 |
| 5,048,644 | 9/1991 | Pelto-Huikko | 187/275 |
| 5,115,684 | 5/1992 | Haeussler | 73/861 |
| 5,156,088 | 10/1992 | Pelto-Huikko | 187/275 X |
| 5,212,951 | 5/1993 | Fargo et al. | 60/479 |
| 5,232,070 | 8/1993 | Blain | 187/29.2 |
| 5,289,901 | 3/1994 | Fargo | 187/275 |

FOREIGN PATENT DOCUMENTS 1378345 12/1974 United Kingdom .

OTHER PUBLICATIONS

Flow Measurement & Meters, A. Linford, E.& F.N. Spon, Ltd., London, 1961, p. 261.

*Primary Examiner*—Kenneth Noland
*Attorney, Agent, or Firm*—Eugene Chovanes

[57] ABSTRACT

A hydraulic elevator up direction control system is provided that has a circulating valve connected between the supply and the return of a source that normally supplies pressure to the cylinder of an elevator. The circulating valve is controlled by a computer regulated stepless variable solenoid valve that influences the pilot fluid pressure in the operating chamber of the circulation valve to control the size of the opening of the circulating valve and thereby the volume of fluid passing through the circulating valve. This affects inversely the volume of fluid passing through a fluid flow measuring valve, to the cylinder, to provide selectably variable up speeds of travel facilitating a fast, smooth, accurate ride of the elevator car as it approaches a stopping point relative to an upper floor of a building. Such operation is substantially independent of the system pressure and fluid viscosity. A selectably variable speed down direction control system operates on largely the same principle.

12 Claims, 2 Drawing Sheets

SERVO CONTROL FOR HYDRAULIC ELEVATOR

Matter enclosed in heavy brackets [ ] appears in the original patent but forms no part of this reissue specification; matter printed in italics indicates the additions made by reissue.

STATEMENT OF THE INVENTION

This invention relates to an electro servo control system for a hydraulic elevator.

REFERENCE TO COMPANION PATENT

The present invention is supplementary to the invention disclosed in my prior British Patent No. 1,378:345 of Dec. 27, 1974 entitled "Drive Control Systems for a Hydraulic Elevator".

BRIEF DESCRIPTION OF PRIOR ART

Hydraulic elevators should approach their scheduled stopping positions gently and accurately. To establish alignment of the bottom of an elevator and a storey floor when stopping following an upward travel, the stopping point is approached from below at a creeping speed of travel during the final stage of approach. Known valves employing hydraulic mechanical methods of speed control are to varying degrees load and viscosity dependent. Such valves, correctly designed, offer a high degree of reliability combined with good ride qualities, but are not suitable for remote, or self re-adjustment.

In recent years there has been a demand on some installations for more consistent traveling times between floor levels. Attempts have been made to meet such demand with computer controls. This has not, however, added to the reliability of operation of the elevator. On the contrary, experience so far has shown that where the principles of computer control to achieve the new demand are employed, problems and call backs have been more frequent than with the mechanical valve.

In addition, the efficiency of those electronic servo valves on the market is relatively low. This is due to the excessive pressure drop through the flow rate measuring system of the valve during up travel or to fluid being bypassed in order to avoid an unstable condition arising when the target speed fed into the electronic program cannot be attained because of mechanical limits, such as the maximum output of the pump having already been reached.

Known electronically controlled elevator valves employing a Hall effect induction type sensor (U.S. Pat No. 5,115,684) for measuring the movement of a flow responsive piston, are limited to the installing of the obligatory magnet such that its movement is parallel to, and of the same distance as, the flow responsive piston itself. This limits the options of design for this section of the valve. In addition, the magnetizing and installation of the magnet is critical and too often leads to unsatisfactory operation.

Another patented application of an induction type sensor serves only to alert a computer that a conically shaped check valve has opened (U.S. Pat. No. 5,212,951). Such induction type sensor is otherwise inadequate to register the distance the check valve has opened, a necessity to servo controlling the movement of the elevator.

SUMMARY OF THE INVENTION

It is an object of the invention to convert the larger movement of a fluid flow responsive disc to the smaller distance measuring capability of an economically available frequency inductive analogue distance measuring sensor. The rate of flow of fluid through a channel towards a cylinder can then be registered electronically for comparison with, by means of a computer, a desirable rate of flow for the purpose of initiating where necessary a correcting process to the rate of flow of fluid. The invention is particularly useful in relation to the movement of a cylinder driving a hydraulic elevator.

Another object of the invention is to apply electronic servo controlled principles to a hydraulic control valve to reliably provide a selectable variety of smooth and accurate travel characteristics of a hydraulic elevator.

Another object of the invention is to control the motion of the elevator using a minimum of electrical energy.

Another object of the invention is to, by employing an electronic flow sensor combined with a computer, assess the distance already traveled by the elevator in order to effect a desired speed or change of speed of the elevator in the remaining distance to be traveled, to accomplish accuracy of stop and passenger comfort.

Another object of the invention is to have the characteristics of foregoing operations remembered and assessed by the computer such that control signals for following operations are revised to achieve shorter traveling times or other desired characteristic of travel performance.

Another object of the invention is to include in the pilot channel system of the electronically controlled valve, overriding safety solenoids to rapidly reduce the flow of fluid in order to slow down the car in the event of uncontrolled motion, in either direction of travel.

DESCRIPTION OF THE PRESENT INVENTION

Figure 1:
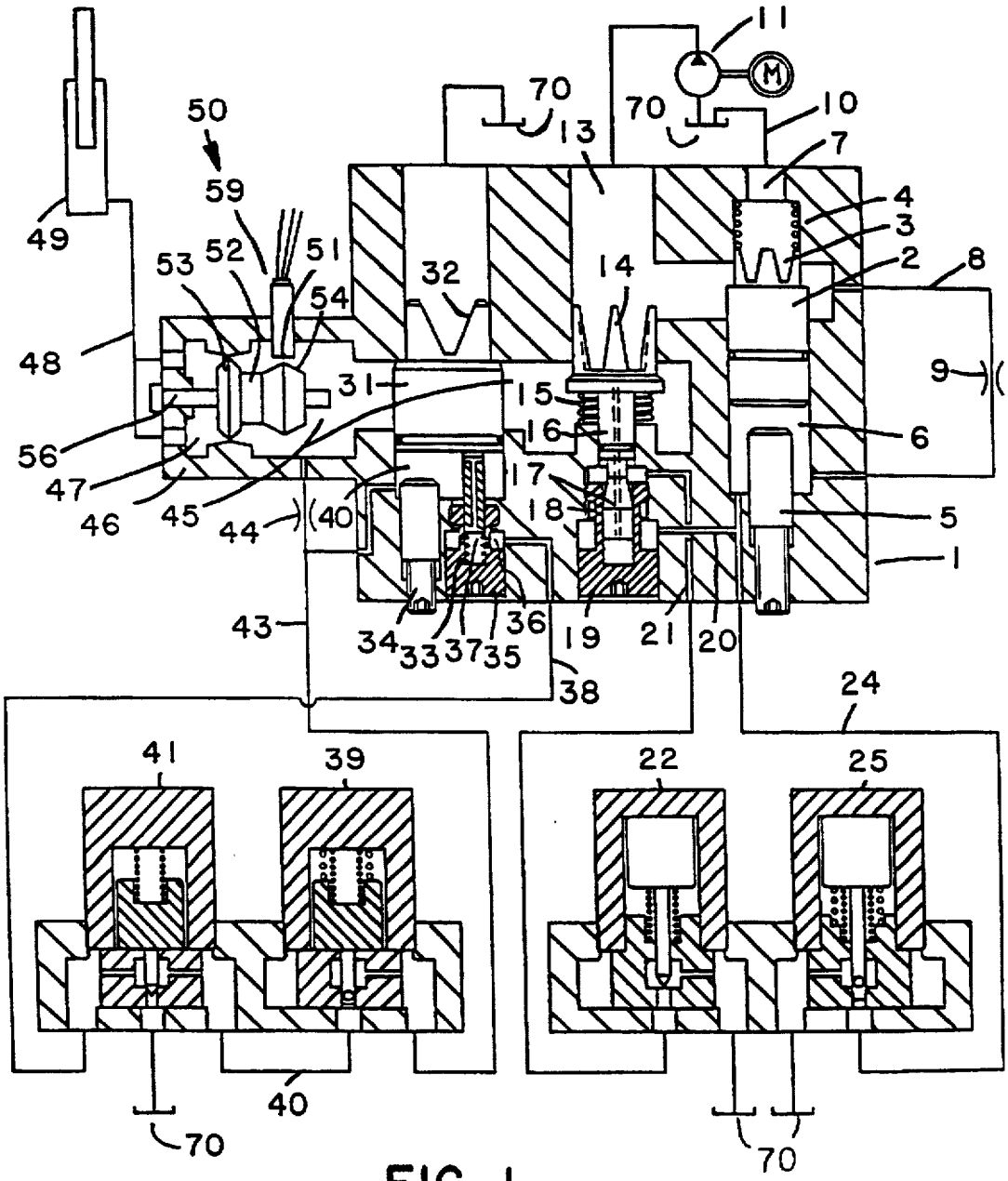
FIG. 1 is a schematic circuit diagram, illustrating an elevator up and down control valve.

To start an upward travel of the elevator, an electric motor driving pump 11 is energized and fluid is dispatched into the pump chamber 13 of the control valve through the opening 3 of the bypass valve 2 and by way of return passage 7 and 10 back to tank 70. Simultaneously with the energizing of the motor, solenoid valves 22 and 25 are energized. Solenoid 22 is a normally open, open—close valve, solenoid 25 a normally open proportional type valve through which the volume of pilot oil flowing through fixed orifice 9 to bypass valve chamber 6 is allowed to escape to tank 70 at a rate inversely proportional to the strength of the electrical signal to the coil, tending to close the solenoid valve.

The strength of this electrical signal is determined by the flow sensing valve 50 which registers the flow rate of fluid to the cylinder 49 raising the elevator. This flow sensing valve 50 consists mainly of a flow sensing spool 52 and a frequency inductive analogue distance sensor 59. The targeted movement of the flow sensing spool 52 programmed into a computer is compared with the actual movement of the flow sensing spool 52, so that the necessary correction can be calculated and the corrected electrical signal applied to the solenoid valve 25. Should there be no or inadequate acceleration of the elevator as programmed, the computer increases the electrical output to this solenoid valve 25, further closing it and thereby causing the pilot pressure in the bypass chamber 6 to rise and the bypass valve to advance against the opening force of bypass spring 4 until pressure in the pump chamber 13 rises above the pressure in the cylinder chamber 45. At this point the elevator begins to accelerate upwards. The continuing up-acceleration of the elevator and all subsequent motions including fast speed, deceleration, slow approach speed and stopping of the elevator are monitored by the flow sensing valve 50 which relays the actual converted values of volume of fluid flowing to the cylinder 49 representing the motion of the elevator, to the computer for comparison with the target values as described above.

Adjusting screw 5 limits the open or rest position of the bypass valve 2 and assures the initial pilot pressure in the system once the pump 11 is running.

Figure 2:
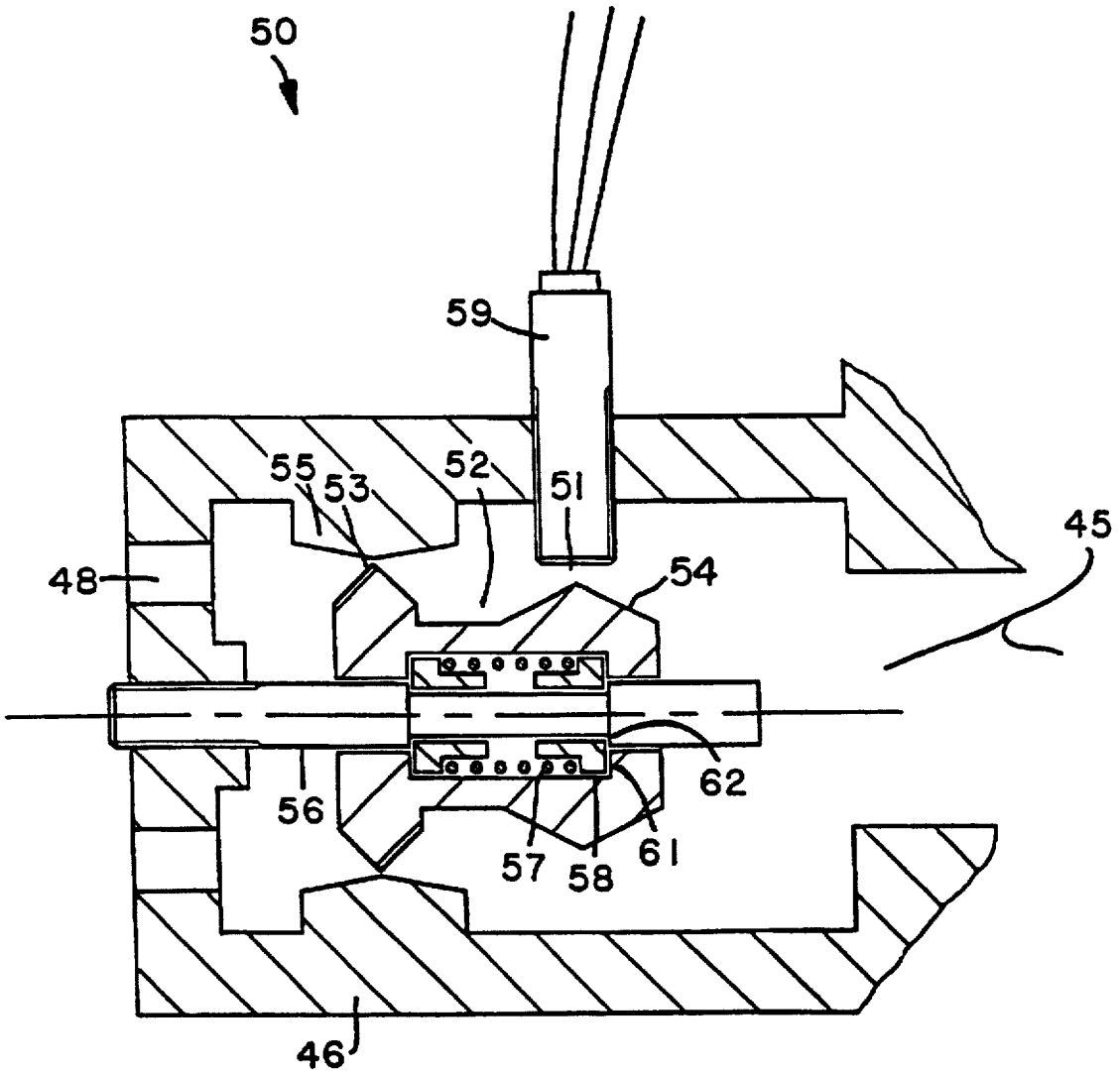
FIG. 2 is a sectional view of the flow sensing valve illustrating a flow spool consisting of a flow responsive disc axially integrated with a symmetrical, conically formed induction dampening profile at which peak and at right angles to the axis of the flow spool, a frequency inductive analogue distance sensor is situated.

The flow sensing valve 50 (FIG. 2) consists of a metal flow sensing spool 52 mounted on a shaft 56, the spool being centrally positioned axially on the shaft spring 57 pressing outwards against sliding bushings 58 which press against the internal shoulders 61 of the flow sensing valve. At one end of the spool is integrated a flow responsive disc 53 fitting closely but sliding within a fixed flow ring 55 such that a flow of fluid either from passage 45 to passage 48 or reversed moves the disc complete with the spool in one direction or the other. Along the axis of the spool on its outside diameter is a low profile conical diametrical form 54, the peak of which is centered beneath the sensing surface 51 of a frequency inductive analogue distance sensor 59 installed at right angles to the axis of the spool.

The volume of fluid flowing through the flow sensing valve 50 determines the size of the opening forced between disc 53 and ring 55 which directly affects the distance of displacement of the flow spool along the shaft, this to a proportional degree affecting the distance between the sensing surface of the distance sensor 59 and the conical surface 54 of the spool. The changing distance is registered by the distance sensor 59 and transmitted to the computer for processing.

Throughout the normal up operation of the elevator the up safety solenoid valve 22 (FIG. 1) remains energized. If, due to a disturbance in the computer system, an undesirable motion of the elevator occurs, such as overspeeding or oscillating, by de-energizing solenoid 22, the elevator can be immediately slowed to a mechanically regulated low speed as long as the pump 11 continues to run and solenoid 25 remains energized. Alternatively should it be required that the elevator travel upwards at a particularly slow speed, for instance during inspection of the elevator or for the purpose of relevelling upwards in the event of the elevator having lowered away from the floor several millimeters due to oil leakage, cooling of the system or loading into the car, through the actuation of a relevelling swish (not shown), solenoid 25 is energized at maximum power and the pump activated, while the up safety solenoid 22 remains de-energized A slow up levelling speed now ensues as the bypass valve 2 is advanced under the effect of pilot oil flow through fixed orifice 9 into the bypass chamber 6, the exiting of this pilot oil flow from bypass chamber 6 through channel 20, channel 21, a solenoid 22 to tank 70 occurring via variable orifice 18, which is partially restricted by the controlling edge 17 of the stem-like extension 16 to the check valve 14 as it covers to a lesser or larger degree the said variable orifice according to the position of the check valve 14 biased towards closing by check valve spring 15, whose hydraulically balanced position depends upon the volume of fluid passing through the opening 3 of the bypass valve, which determines the remaining volume of fluid passing from the pump chamber 13 to the cylinder chamber 45 of the valve 50 and thence to the cylinder, thus directly controlling the slow up levelling speed of the elevator. The position of variable orifice 18 which determines in which position the check valve 14 becomes hydraulically balanced and thereby the speed of the elevator, can be changed through adjusting screw 19 inwards or outwards to obtain the required slower or faster mechanical up levelling speed of the elevator.

This slow up levelling speed system was originally the subject of the inventor's British Patent Specification No. 1 378 345 published 27 Dec. 1974.

However, its application as a safety back-up feature to a sensitive electronic servo valve as described above is previously unknown.

To effect a downwards travel of the elevator, because of the functionally symmetrical construction of the flow sensing spool 52, the effect of fluid flow through the flow sensing valve 50 on the frequency inductive distance sensor and consequently the signal transmitted to the computer from where the necessary corrections to the electrical power applied to the down proportional type solenoid valve 39 for the down travel are generated, is similar in principle to that described for the upward direction of travel except that the pump 11 is not required to run, the fluid flow and therefore the flow sensing spool 52, move in the opposite direction, that is in the general direction cylinder to tank 70 or cylinder chamber 47 to cylinder chamber 45 and that the down safety solenoid valve 41 is energized.

As with upwards travel, in the case of overspeeding or oscillating of the elevator, it may be required that the elevator's downward travel be brought down to a slow speed by de-energizing the coil of the proportional type solenoid valve 39 which closes, whilst the down safety coil of the down safety solenoid valve 41 remains energized and open.

A slow down levelling speed now ensues as the down valve 31 is advanced according to the effect of pilot fluid flowing through fixed orifice 44 into the down valve chamber 40, the exiting of this pilot oil flow from the down valve chamber through channel to channel 38 by way of orifice 36 which opening is restricted by the controlling edge 37 of the stem 34 which is pressed against the down valve 31 by the spring 33 as the controlling edge of the stem covers to a lesser or larger degree the said down valve 31 effecting a hydraulically balanced position of the down valve 31, this position determining the extent of the opening in the down flow guide 32 through which fluid may flow from the cylinder to tank 70 to determine the downwards speed of the elevator.

Orifice 36 in down slow speed adjusting screw 35 can be shifted in its position relative to the down valve by turning the adjusting screw inwards or outwards so that the-hydraulically controlled down slow-speed can be mechanically set as required.

A further application of the down safety solenoid is to completely stop the downwards movement of the elevator should it not be operating in the desired manner, by deenergizing the down safety coil 41.

Screw 35 mechanically limits the maximum opening of the down valve and thereby the maximum possible down speed of the elevator.

I claim:

1. In a flow sensing channel device of a hydraulic elevator control valve comprising:

a valve housing with a channel, a flow ring having a center and taper on both sides of its center, fixed in the housing, a flow responsive metal spool having an axis and a diameter, one end of its diameter being in the shape of a disc, movable along its axis within the flow ring, the disc being spring centered relative to the center of the ring under no flow conditions, a space between the disc and the flow ring through which fluid may pass, wherein said space opens proportionally in size to the rate of the fluid flowing through, whereby flow through the channel in either direction causes the disc to be displaced, a conical diametrical form being located along the disc's axis at a distance and opposite end from the disc shaped portion, wherein both parts, the disc and the conical diametrical form, are integral parts of the metal sensing spool, such that when flow takes place, the metal spool and its conical diametrical form moves proportionally to the flow thereto, the conical diametrical form having a peak, a frequency inductive distance sensor spool means and a sensing point located on its bottom, both protruding through the wall of the valve housing into the channel at right angles to the axis of movement of the metal sensing spool, whereby said peak of the conical diametrical form under conditions of no flow is centered opposite the sensing point, a computer means for receiving and assessing signals from the inductive analogue distance sensor spool means, and proportionally revising an electrical output, a magnetic coil means for receiving the electrical output from the computer means, a proportional type pilot solenoid valve means for receiving the commands from the magnetic coil means, and steplessly controlling a pilot oil flow through a pilot chamber and thus controlling a pilot pressure, a bypass valve means and bypass spring so connected that the increase or decrease in oil flow from the pilot chamber causes the bypass valve to close down or open up the bypass spring, thereby affecting the oil flow to a cylinder means for controlling the speed of an elevator, a storage tank means for recycling oil and for receiving a portion of the oil flow from the bypass valve.

2. Apparatus as defined in claim 1 wherein the principle applied to an up-travel and a down travel cycle of an elevator.

3. Apparatus as described in claim 1 further including:

a down valve means for regulating the flow from the cylinder to the tank, an auxiliary two-position open close type solenoid valve means positions hydraulically in series with an electronically controlled stepless variable down solenoid valve means for regulating the movements of said down valve, wherein said electronically controlled stepless variable down solenoid valve normally regulates the down valve, said auxiliary two-position open close type solenoid valve is energized and open under normal conditions of down travel, and can be rapidly closes when de-energized to shut off the flow of the pilot oil exiting from a down pilot chamber of the down valve, a cylinder pressure line connected to an adjustable orifice wherein the pilot oil flows while the auxiliary two-position open close type solenoid valve is de-energized, whereby the down valve is closed to prevent the elevator from further overspeed descent.

4. Apparatus as defined in claim 3 further comprising a down slow speed adjusting screw for regulating the adjustable orifice whereby a hydraulically controlled down slow speed can be mechanically set, and said auxiliary two-position open close type solenoid valve when operated alone controls the limited opening of the down valve through said down slow speed adjusting screw and adjustable orifice, said auxiliary two-position open close type solenoid valve is energized electrically when operating alone while the stepless variable down solenoid remain inactive.

5. Apparatus as defined in claim 3 further comprising a manual two-position open close type valve means, said manual two-position open close type valve means being hydraulically connected in parallel with the auxiliary two-position open close type solenoid valve, whereupon the manual activation of manual two-position open close type solenoid valve, the elevator will lower at a slow speed without the necessity for electrical power.

6. Apparatus as defined in claim 1 further comprising:

a down valve means for regulating the flow from the cylinder to the tank, a manual two-position open close type valve means positions hydraulically in series with an electronically control stepless variable down solenoid valve means for regulating the movements of said down valve, wherein said electronically controlled stepless variable down solenoid valve normally regulates the down valve, said manual two-position open close type valve is manually operated and open under normal conditions of down travel, and can be manually close to shut off the flow of the pilot oil exiting from a down pilot chamber of the down valve, a cylinder pressure line connected to an adjustable orifice wherein the pilot oil flows while the manual two-position open close type solenoid valve is closed, whereby the down valve is closed to prevent the elevator from further overspeed descent.

*7. In a flow sensing channel device of a hydraulic elevator control valve comprising:*

*a valve housing with a channel,*

*a flow ring having a center fixed in the housing,*

*a flow responsive metal spool having an axis and a diameter, one end of its diameter being in the shape of a disc, movable along its axis within flow ring, the disc being spring centered relative to the center of the ring under no flow conditions,*

*a space between the disc and the flow ring through which fluid may pass, wherein said space opens proportionally in size to the rate of the fluid flowing through, whereby flow through the channel in either direction causes the disc to be displaced,*

*a conical diametrical form being located along the disc's axis at a distance and opposite end from the disc shaped portion, wherein both parts, the disc and the conical diametrical form, are integral parts of the metal sensing spool, such that when flow takes place, the metal spool and its conical diametrical form moves proportionally to the flow thereto, the conical diametrical form having a peak,*

*a frequency inductive distance sensor spool means and a sensing point located on its bottom, both protruding*

*through the wall of the valve housing into the channel at right angles to the axis of movement of the metal sensing spool, whereby said peak of the conical diametrical form under conditions of no flow is centered opposite the sensing point,*

*a computer means for receiving and assessing signals from the inductive analogue distance sensor spool means, and proportionally revising an electrical output,*

*a magnetic coil means for receiving the electrical output from the computer means,*

*a proportional type pilot solenoid valve means for receiving the commands from the magnetic coil means, and steplessly controlling a pilot oil flow through a pilot chamber and thus controlling a pilot pressure,*

*a bypass valve means and bypass spring so connected that the increase or decrease in oil flow from the pilot chamber causes the bypass valve to close down or open up the bypass spring, thereby affecting the oil flow to a cylinder means for controlling the speed of an elevator,*

*a storage tank means for recycling oil and for receiving a portion of the oil flow from the bypass valve.*

*8. Apparatus as defined in claim 7 wherein the principle applied to an up-travel and a down travel cycle of an elevator.*

*9. Apparatus as described in claim 7 further including:*

*a down valve means for regulating the flow from the cylinder to the tank,*

*an auxiliary two-position open close type solenoid valve means positions hydraulically in series with an electronically controlled stepless variable down solenoid valve means for regulating the movements of said down valve, wherein said electronically controlled stepless variable down solenoid valve normally regulates the down valve, said auxiliary two-position open close type solenoid valve is energized and open under normal conditions of down travel, and can be rapidly closes when de-energized to shut off the flow of the pilot oil exiting from a down pilot chamber of the down valve,*

*a cylinder pressure line connected to an adjustable orifice wherein the pilot oil flows while the auxiliary two-position open close type solenoid valve is de-energized, whereby the down valve is closed to prevent the elevator from further overspeed descent.*

*10. Apparatus as defined in claim 9, further comprising a down slow speed adjusting screw for regulating the adjustable orifice whereby a hydraulically controlled down slow speed can be mechanically set, and said auxiliary two-*i position open close type solenoid valve when operated alone controls the limited opening of the down valve through said down slow speed adjusting screw and adjustable orifice, said auxiliary two-*position open close type solenoid valve is energized electrically when operating alone while the stepless variable down solenoid remain inactive.*

*11. Apparatus as defined in claim 9 further comprising a manual two-position open close type valve means, said manual two-position open close type valve means being hydraulically connected in parallel with the auxiliary two-position open close type solenoid valve, whereupon the manual activation of manual two-position open close type solenoid valve, the elevator will lower at a slow speed without the necessity for electrical power.*

*12. Apparatus as defined in claim 7 further comprising:*

*a down valve means for regulating the flow from the cylinder to the tank,*

*a manual two-position open close type valve means positions hydraulically in series with an electronically control stepless variable down solenoid valve means for regulating the movements of said down valve, wherein said electronically controlled stepless variable down solenoid valve normally regulates the down valve, said manual two-position open close type valve is manually operated and open under normal conditions of down travel, and can be manually close to shut off the flow of the pilot oil exiting from a down pilot chamber of the down valve,*

*a cylinder pressure line connected to an adjustable orifice wherein the pilot oil flows while the manual two-position open close type solenoid valve is closed, whereby the down valve is closed to prevent the elevator from further overspeed descent.*

* * * * *